United States Patent [19]

Isono

[11] 4,093,365
[45] June 6, 1978

[54] AUTOMATIC FOCUS ADJUSTING DEVICE

[75] Inventor: Tadao Isono, Kokubunji, Japan

[73] Assignee: Nihon Beru-Haueru Kabushiki Kaisha (Bell & Howell Japan, Ltd.), Higashimurayama, Japan

[21] Appl. No.: 782,106

[22] Filed: Mar. 28, 1977

[30] Foreign Application Priority Data

Mar. 30, 1976 Japan .............................. 51-38477[U]

[51] Int. Cl.² .......................... G03B 3/00; G03B 7/08
[52] U.S. Cl. ...................................... 352/140; 352/27; 354/25
[58] Field of Search ..................... 352/27, 140; 354/25

[56] References Cited

U.S. PATENT DOCUMENTS

| | | | |
|---|---|---|---|
| 3,733,989 | 5/1973 | Wick et al. | 354/25 |
| 3,849,643 | 11/1974 | Takeda | 352/140 |
| 3,988,747 | 10/1976 | Lermann et al. | 354/25 |
| 4,059,756 | 11/1977 | Wilwerding | 354/25 |
| 4,059,757 | 11/1977 | Wilwerding | 354/25 |
| 4,059,758 | 11/1977 | Wilwerding | 354/25 |

Primary Examiner—Russell E. Adams
Attorney, Agent, or Firm—John E. Peele, Jr.; Aaron Passman

[57] ABSTRACT

For use in a sound motion picture camera adapted to handle both sound and silent film and having a driven capstan at the sound station thereof, the capstan drive motor is used to power a driven component of an automatic focusing system by which a focusable objective lens can be focused automatically on a remote subject. By a control switch, associated with the camera operation control member, either manual or automatic focusing modes can be selected, the automatic mode being further selectable as being continuous during film transport operation or limited to a period before film transport operation begins.

14 Claims, 6 Drawing Figures

AUTOMATIC FOCUS ADJUSTING DEVICE

The present invention relates to improvements in a motion picture camera adapted to handle both sound film and silent film and having a focusable objective lens adjustable by an automatic focus adjusting system. The camera has a sound station provided with a driven capstan, the motor drive of which can be used to power a driven component of the automatic focusing system. A control switch associated with the camera operation control member permits a selection of automatic focus system operation modes.

In electrically powered cameras capable of driving sound film, a motor is provided for transporting film continuously through the sound station, which motor is usually independent of the motor for transporting film across the exposure aperture. The added feature of the automatic focusing system has generally required that some additional weight and size be added to a camera beyond such a camera not having comparable features. Typically, an automatic focusing system for optical instruments may use the principle of spatial image correlation wherein a scene is scanned by a sensor and the image thereof is correlated electronically with an image from another sensor. Due to weight, space, and bulk limitations in a small hand held camera, an additional motor for driving the scanning sensor of the automatic focus adjusting system is undesirable. Therefore, by use of selective controls and the sound film driving motor to power the scanning sensor of the automatic focus adjusting system, a flexible automatic focus system with manual override is available without the addition of as much weight and bulk as might be contemplated.

The automatic focus adjusting system for focusing an objective lens is highly desirable as a means to relieve the operator of yet another operation, usually performed manually. Such operations detract from the concentration the operator applies in selecting the picture and the sound. Most of today's sound motion picture cameras for the mass market have been automated as to film drive, exposure control, and sound recording. However, until recently, adjusting focus of the camera's objective lens for camera-to-subject or object distance has been a substantially manual operation notwithstanding that the adjustment may be mechanically or electrically assisted. Currently, several proposals have been patented for optically/electronically detecting the distance from a subject to the camera, and adjusting the focus of a focusable objective lens to that distance. Such an automatic focusing system may have electronics for evaluating images passed through an auxiliary optical system or systems, and controlling power to a motor for driving the focusing cell of an objective lens.

Typical of the patented automatic focusing systems which might be used is the system described in U.S. Pat. No. 3,958,117 to Stauffer. This patent describes an improved automatic focusing system which can be mass produced, is not unduly complex, bulky, and expensive, and is reliable for use in optical instruments for the mass market such as cameras. The system includes a scanning means which moves an optical ray bundle to sweep an image across a light sensitive array, which is connected with another similar array of a distance detector, from which signals are fed to signal processing circuitry. The output of the signal processing circuitry connects the detector to a driver for adjusting the focus of the objective lens according to the position of the scanning sensor means when the images impinging on the arrays are coincident.

According to the present invention as related to a sound motion picture camera, an existing motor for driving a capstan in the sound station can be used to drive the scanning sensor of the focusing system. Further, electronics and switches are included to provide for selective modes of operation wherein either automatic or manual focusing can be performed, and wherein the automatic mode can be operated either only before the film is being transported, or both before and during film transport operation. Further, the automatic focus adjustment can be operated while the camera contains either sound film or silent film.

An object of the invention is to provide in a sound motion picture camera a control system wherein the focus adjusting device is powered by the capstan motor.

Another object of the invention is to provide in a sound motion picture camera a control system including selective switching means enabling the sound capstan drive motor to power a focus adjusting device when a silent film is loaded in the camera.

The above and other objects and advantages of the invention will become apparent from reference to the detailed specification and the accompanying drawings in which like numerals refer to like parts.

Figure 1:
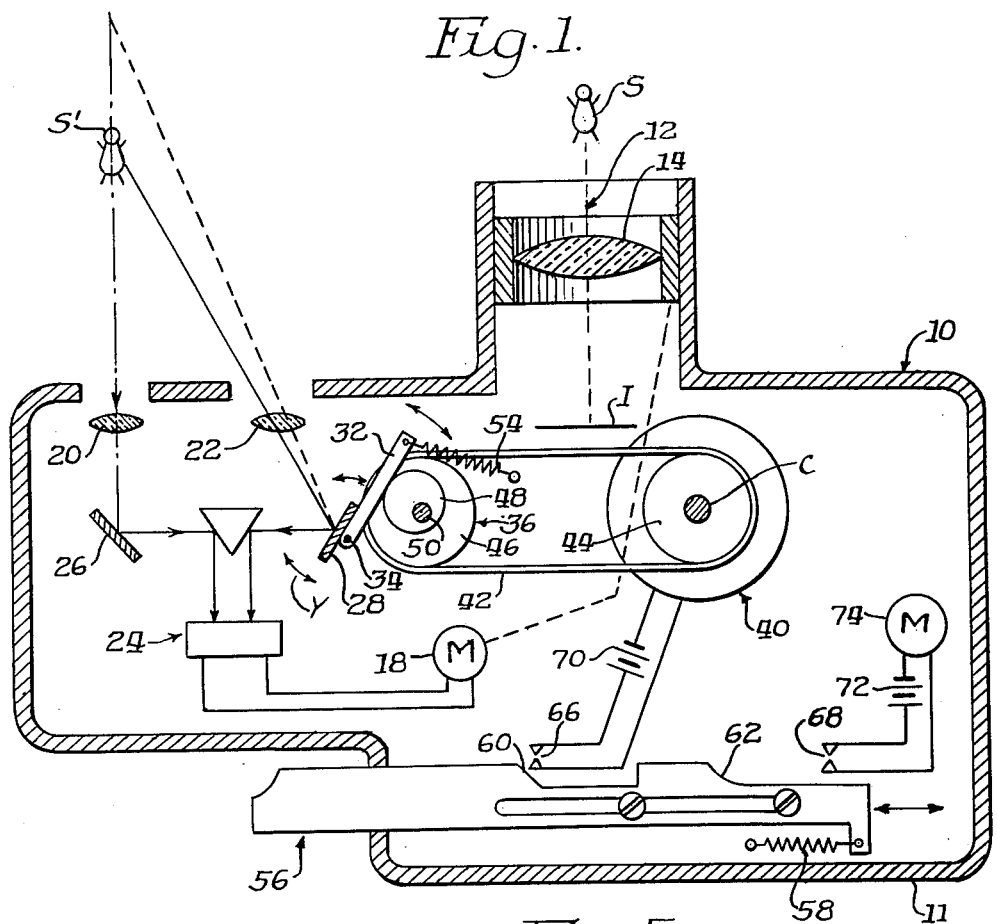
FIG. 1 is a schematic representation of an embodiment for driving the scanner of an automatic focus system and controls for selecting the operating mode.

Referring to the drawings, in FIG. 1 is an automatic focus adjusting system of an optical instrument such as a motion picture camera 10 having a housing 11, at least partially enclosing selected components. The camera of the preferred embodiment is provided with a film chamber (not shown) which is adapted to receive either a cartridge of silent film or a cartridge of sound film. The film is moved past an exposure station including an image plane I and, if sound, through a sound station, (represented schematically by capstan C), conventionally including a capstan for driving the film past a transducer at a constant rate. Also, the camera has a focusable objective lens 12 for imaging a remote subject S in the field of view thereof onto the image plane I, when focused to an object or camera-to-subject distance. A focusing cell 14 of the lens is axially adjustable along the optical axis of the lens through a transmission 16. A drive means 18 is connected to the transmission and energized selectively by a focus drive controlling circuit of the automatic focus adjusting system. In the system according to this preferred embodiment, the distance from the optical instrument to the remote subject S' (same as S) is determined by two optical systems 20, 22 which respectively image the subject on an automatic focus detector 24. The detector includes at least a pair of arrays of light sensitive cells, focus determining circuitry, and focus drive controlling circuitry. Light rays of each of the optical systems are respectively imaged on one of the arrays of light sensitive cells, after being deflected by a distance measuring sensor or mirror respectively 26 and 28. One mirror 28 is driven in a scanning motion to sweep across a portion of the field of view of the objective lens so as to periodically make the image of the subject coincident on the detector 24 with the image from the fixed mirror 26. Coincidence of the images occurs when the objective lens would be focused on a subject at the prescribed distance.

Broadly, the scanning sensor 28 is oscillated to scan back and forth across the scene sufficiently to image a subject within the focus range of the objective lens. To control the motion of the scanning sensor and to drive the sensor, a driven distance measuring sensor supporter 32 is provided. This supporter, to which the movable mirror is connected, is pivotable about an axis 34 in response to an oscillating driver 36. Rotation of the oscillating driver is transmitted from a capstan drive motor 40 through a belt 42 which passes about a pulley 44, shown to be co-axial with the motor, and a pulley 46 arranged to power the oscillating driver 36. A small eccentric or peripheral cam 48 is driven by pulley 46 about an axis 50. By a cam follower portion of the support 32, held in engagement with the eccentric by a spring 54, the support is caused to pivot about axis 34. Thereby, rotation of the eccentric causes the mirror to cyclically sweep an image over the fixed detector 24 through an arc determined by the throw of the cam. By the principle of triangulation, the object distance is determined by the angle of the scanner when the scanning image is in coincidence with the fixed image from the fixed sensor mirror 26. Correlation of the position of the scanning sensor and the position of the lens may be by mechanical or electro-mechanical systems.

An actuator control of the camera is disclosed as a trigger member 56 displaceable between a camera inoperative position and a camera operative position. A spring 58 biases the trigger member from the camera operative or "on" position toward the camera inoperative or "off" position from which the trigger member is displaced usually by manual actuation, such as being depressed. The trigger member is provided with a first cam surface 60 and a second cam surface 62 which are arranged respectively relative to a first normally open switch 66 and a second normally open switch 68. By relative arrangement of the cam surfaces and the switch surfaces, partial actuation of the trigger member 56 causes the closure of the first switch 66 only. The second switch 68 is closed only upon complete actuation or displacement of the trigger member. The first switch is in circuit with a power supply 70 for energizing the capstan drive motor 40, while the second switch is in circuit with a power supply 72 for energizing the shuttle and film transport drive motor 74. Thus, upon depression of the trigger member, the capstan drive motor is energized slightly before the film transport drive motor. Further, the capstan drive motor can be energized alone by partial actuation of the trigger member.

The scanning motor drives the scanning sensor 28 in an oscillating path as shown by arrow Y. By electronics of the automatic focus detector 24, the condition of focus is determined when the images from the two optical systems coincide. However, when the condition of lack of focus is detected by the images not being in coincidence, circuitry of the automatic focus detector is actuated and the lens focusing motor 18 is energized to cause automatic adjustment of focus of the objective lens. Focus is achieved in a short period of time as determined by one or more sweeps of the scanning sensor 28.

During this period, the capstan C reaches full speed and further movement of the trigger member toward the right closes the switch 68, for energizing the film transport drive motor 74 whereby a photographic sequence is begun with the image of the subject in focus and the film being moved through the sound station at a constant rate.

Figure 2:
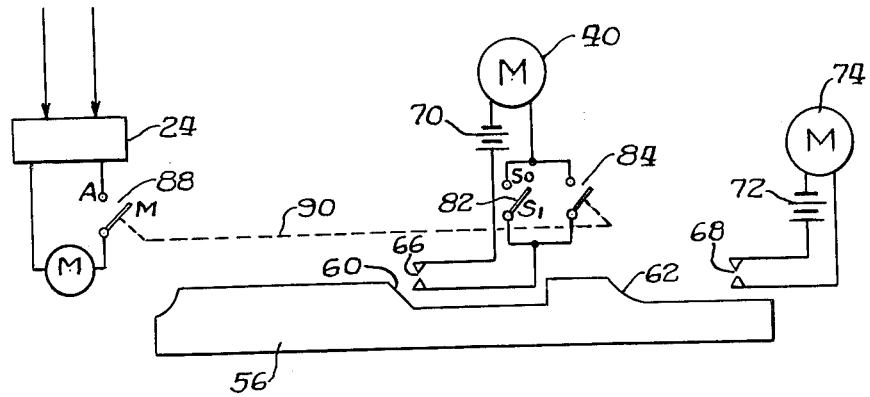
FIG. 2 is schematic diagram of an operational mode selecting circuit for controlling the system of FIG. 1.

In FIG. 2, a switch 82 is a sound/silent cartridge selecting switch which is arranged in the sound motion picture camera to detect whether the film supply cartridge contains a sound film or a silent film. When the cartridge contains silent film, the switch 82 is open and the capstan motor is not energized to conserve the energy as is conventionally supplied in batteries. However, when the cartridge contains sound film, the switch 82 is closed causing the capstan motor to be energized. Installed in parallel with the switch 82 is another switch 84, operable for automatic focus changeover. Even if switch 82 is open indicating that a silent cartridge is being used, the capstan motor can be energized for driving of the movable sensor 28 upon closing the switch 84 thereby completing the circuit therethrough.

For selecting whether the focus system is to be automatic or manually controlled, an auto/manual focus selecting switch 88 is included in the circuit. When the switch is set to "M", the switch permits the user to manually focus the lens by scale or estimation. Thus, the user can override the automatic focusing system if the user does not wish to rely on automatic focus selection, such as when the subject to be focused on is of minor importance to the scene being photographed insofar as the automatic focusing system is concerned. The switch cannot select the mode of operation of the automatic focus adjusting system and cannot disable the manual focus when the sound cartridge is used since the sound cartridge closes the switch 82. However, the switch 88 can select between "auto" and "manual" by disabling the electronics even if the movable sensor is caused to scan the scene by the rotation of the capstan drive motor through switch 82. The switch 82 and the switch 88 are connected to one another by a coupling 90 to enable auto/manual selection irrespective of the film type being used in the camera. That is, the lens focusing drive motor 18 can be made operative when the movable contact of switch 88 is closed to the A contact. By the interconnection with the switch 84, the capstan drive motor circuit is completed although the circuit through switch 82 is open. Further, the drive motor 18 is prevented from operating when the circuit through switch 88 is incomplete, whether or not the circuit through switch 82 is complete.

Figure 3:
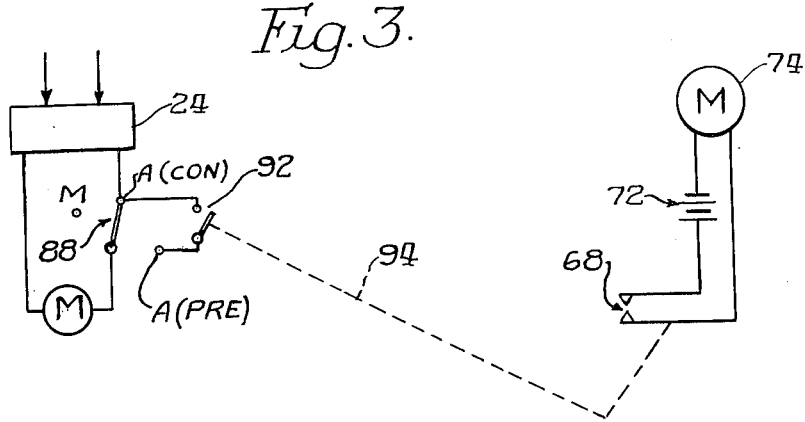
FIG. 3 is an alternate embodiment of a mode selecting circuit.

In the modification shown in FIG. 3, in circuit with the auto/manual switch 88 is another switch 92, shown as a "pre/con" switch for causing the automatic focusing system to be actuated to focus the objective lens either only before a photographing sequence begins or continuously before and during a photographing sequence. That is, "pre-focusing" permits the automatic focusing system to adjust the focus only when the trigger member 56 is in the first operative condition. Similarly, the "continuous focusing" condition permits the focusing action to continue after the initial pre-focus and to maintain correct focus during the period of a photographing sequence. In the M (manual) position of the switch 88, the circuit to the focusing drive motor and/or control electronics therefor is open to permit manual override of the automatic focusing system.

In this circuit with one side of switch 88, the switch 92 is selected to function oppositely to switch 68 through which the shuttle drive motor 74 is energized. The switch 92 is installed on the automatic focusing branch of the switch 88 between the pre-focus contact PRE and the continuous automatic focus adjusting contact CON. The switch 92 is connected to switch 68 by a coupling 94 so that the circuit through switch 92, when positioned at contact PRE, is opened as the switch 68 is closed. Thus, focusing of the objective lens is automatically adjusted only before a photographing sequence begins when the trigger member 56 is actuated to a film transporting condition. Prior to that time, the circuit through switch 92 PRE has been completed to permit operation of the focusing drive motor 18. However, when the circuit through switch 92 is positioned at contact CON, focus of the lens is automatically adjusted continuously during the photographing sequence since the circuit through switch 92 is completed. The focusing motor drive control is not affected by the switch 92 even if the movable contact for the PRE contact is opened when the switch 68 is closed upon actuation of the trigger member to film transporting condition.

Figure 4:
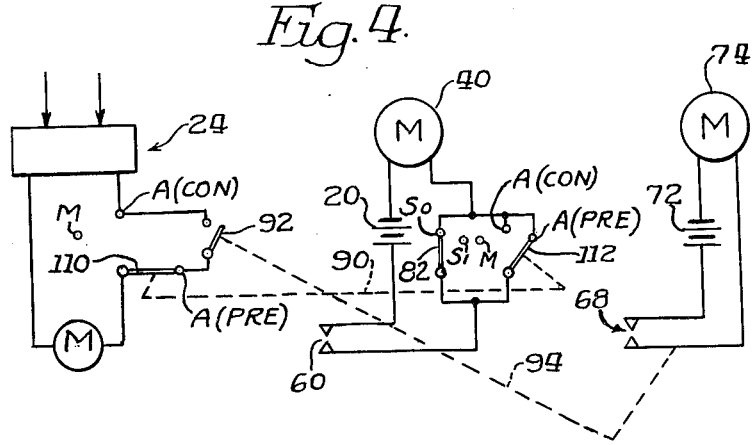
FIG. 4 is yet another alternate embodiment of the circuit.

In FIG. 4, a modification of the mode selection circuit is shown with the functions of the auto/manual and pre/con switches coupled or combined as a manual/-pre-auto/continuous focus mode selecting switch 110 which is installed in place of auto/manual switch 88 as previously described. The continuous/pre-focus side of switch 110 is coupled with the film transport drive motor control switch 68, and functions oppositely to that switch, although in cooperation therewith. When the movable contact of switch 110 is positioned at contact M (manual), the focus of the objective lens is not automatically adjusted as the circuit of the automatic focus detector 24 is opened. However, when the movable contact is positioned at contact A (automatic), the focus is automatically adjusted as permitted by the circuit through either the pre-auto focus adjustment contact A (PRE) or the continuous auto focus adjustment contact A (CON). A switch 112 comprising the contacts A (CON), A (PRE) and M is installed in parallel with silent/sound cartridge selecting switch 82 for controlling the capstan drive motor 40. Also, the mode selecting switch 112 is coupled to switch 110 to cooperate therewith as shown in and described with respect to FIG. 2.

Figure 5:
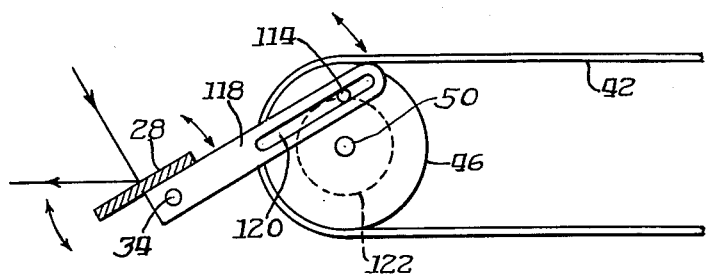
FIG. 5 is a schematic representation of another embodiment of the scanner drive system.

Another embodiment of a driving device for the movable sensor 28 is shown in FIG. 5. In this device, the pulley 46 drives a pin 114 which is positioned radially of the axis 50 about which the pulley rotates. The modified sensor supporter 118, pivoted about axis 34, is provided along a length thereof remote from the pivot with a long groove 120 into which the pin 114 passes. When the pulley 46 is rotated, the pin 114 is rotated in the dotted line path 122 causing the scanning sensor 28 to sweep or scan the sensor throughout the scanning path in response to movement of the sensor supporter 118 about the axis 34.

Figure 6:
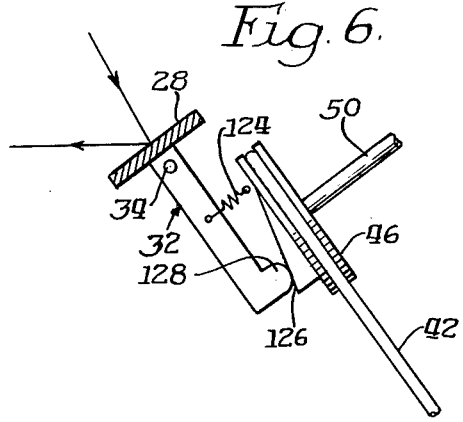
FIG. 6 is still another embodiment of a scanner drive system.

Still another embodiment of a driving means for the sensor supporting 32 is shown in FIG. 6. The sensor supporter 32 is biased by a spring 124 into engagement with a surface cam 126 which extends from a surface of the pulley 46. As the pulley rotates, a cam follower 128 of the pivoted supporter is driven cyclically about the axis 34 whereby the sensor 28 is oscillated to scan the scene to be photographed in the manner as described above.

In summary, an automatic focusing system as described above causes the focusable objective lens to be automatically adjusted to an object distance when a control switch is in an automatic focusing mode of operation. A movable sensor is driven oscillatably to scan an area substantially within the field of view of the objective lens. The prime driver for the sensor is the existing capstan drive motor of a sound motion picture camera. Since the scanning drive is actuated through the trigger member of the camera, and the capstan drive motor can be energized before the film transporting motor is energized (for both sound and silent film), as well as during the time when either film is transported, the focus determining drive can be actuated selectively. By several control embodiments, as shown in FIGS. 2, 3, and 4, any of several operational modes including manual or automatic, or before and/or during a photographing sequence can be selected. Further, as shown in FIGS. 5 and 6, various sensor drive transmitting means can be used to cause the sensor to be driven as required.

I claim:

1. In a motion picture camera for transporting sound and silent film, the camera having an operation control means, a film transport drive at a film exposure station energizably responsive to the operation control member, a sound station including a capstan selectively powered by a capstan drive, a focusable objective lens for imaging a remote subject onto an image plane at the film exposure station, and an improved automatic focus adjusting system for focusing said objective lens, and having a fixed sensor, an oscillatable sensor for imaging the remote subject on detector means of the adjusting system, and means responsive to the detector for adjusting the focus of said objective lens relative to camera-to-subject distance, the improvement comprising:

circuitry for energizing selectively the capstan drive motor responsive to first switch means associated with said camera operation control member and second switch means responsive to detecting whether silent film or sound film is in the camera;

means connecting said capstan drive to power said oscillatable sensor; and focus mode selection means associated with said first and second switch means for energizing said capstan drive to power said oscillatable sensor independently of energization of said film transport drive, whereby said objective lens can be adjusted into focus on a remote subject before film is transported through said exposure station of said camera.

2. Automatic focus adjusting system as in claim 1 wherein said second switch means de-energizes said capstan drive when silent film is in said camera; and said focus mode selection means is connected parallel in circuit with said second switch means to selectively energize said capstan drive whether sound film or silent film is in said camera.

3. Automatic focus adjusting system as in claim 2 wherein said second switch means energizes said capstan drive when sound film is in said camera; and said focus mode selection means can selectively de-energize said capstan drive whether sound or silent film is in said camera.

4. Automatic focus adjusting system as in claim 1 wherein said second switch means energizes said capstan drive when sound film is in said camera; and said focus mode selection means is connected in circuit with said detector means to de-energize said lens adjusting system whether sound film or silent film is in said camera.

5. Automatic focus adjusting system as in claim 1 wherein said camera operation control means is a three position trigger member connected to a power supply, and having a camera inoperative position, and two camera operative positions, the capstan drive being energized in both said positions and the film transport means being energized only in the second operative position.

6. Automatic focus adjusting system as in claim 5 wherein said focus mode selection means is a multiple position switch in circuit with said objective lens adjusting means and coupled with said camera operation control member oppositely to said film transport means so that in one position of said switch said adjusting means is energized when said control member is in said first operative position and is de-energized when said control means is in said second operative position,
whereby focus of said objective lens is adjusted when said camera operation control member is in said first operative position and is not adjusted when said control member is in said second operative position.

7. Automatic focus adjusting system as in claim 6 wherein when said focus mode selection means is in another position, said objective lens adjusting means is de-energized.

8. Automatic focus adjusting system as in claim 6 wherein when said focus mode selection means is in another position, said objective lens adjusting means is energized when said camera operation control member is in either of said camera operative positions.

9. Automatic focus adjusting system as in claim 1 wherein said oscillatable sensor drive connecting means includes a circumferential cam mounted on a rotatably driven member powered by said capstan drive whereby said sensor is caused to oscillate as said cam rotates.

10. Automatic focus adjusting system as in claim 1 wherein said oscillatable sensor drive connecting means includes a surface cam mounted on a rotatable member powered by said capstan drive, said oscillatable sensor includes a cam follower, and said connecting means further includes means biasing said cam follower of said sensor against said surface cam.

11. In a motion picture camera adapted for transporting sound film and silent film, the camera having a multiple position control member connected to a power supply and having a camera inoperative position and two camera operative positions, a film transport drive at a film exposure station energizably responsive to the control member being in one camera operative position, a sound station including a capstan powered by a capstan drive for driving film through said sound station when said control member is in said two camera operative positions, a focusable objective lens for imaging a remote subject onto an image plane at the film exposure station, and an improved automatic focus adjusting system for focusing said objective lens and having a fixed sensor, a movable sensor for impinging images of a remote subject on detector means of the system, and means responsive to the detector means for adjusting the focus of said objective lens, the improvement comprising:
circuitry for controlling energization of the capstan drive through first switch means associated with said camera control member and second switch means for detecting whether silent film or sound film is in the camera;
means connecting said capstan drive to transmit power to said movable sensor; and
focus mode selection means associated with said first and second switch means for energizing said capstan drive to power said movable sensor,
whereby said adjusting means can adjust said objective lens into focus on a remote subject before film is transported through said exposure station of said camera, and while film is transported through said exposure station.

12. Automatic focus adjusting system as in claim 11 wherein said second switch means de-energizes said capstan drive when silent film is in said camera, and said focus mode selection means is connected parallel in circuit with said second switch means to selectively energize said capstan drive whether sound film or silent film is in said camera; and
wherein said second switch means energizes said capstan drive when sound film is in said camera, and said focus mode selection means can selectively de-energize said capstan drive whether sound or silent film is in said camera.

13. Automatic focus adjusting system as in claim 11 wherein said second switch means energizes said capstan drive when sound film is in said camera; and said focus mode selection means is connected in circuit with said detectro means to de-energize said lens adjusting system whether sound film or silent film is in said camera.

14. Automatic focus adjusting system as in claim 11 wherein said sensor drive connecting means includes a cam mounted on a driven member rotatably powered by said capstan drive and said movable sensor includes a cam follower engageable with said cam,
whereby said sensor is caused to oscillate as said driven member rotates.

* * * * *

UNITED STATES PATENT OFFICE
CERTIFICATE OF CORRECTION

PATENT NO. : 4,093,365
DATED : June 6, 1978
INVENTOR(S) : Tadao Isono

It is certified that error appears in the above-identified patent and that said Letters Patent are hereby corrected as shown below:

Column 8, line 42 (Claim 13, line 5), change "detectro" to --detector--.

Signed and Sealed this

Twelfth Day of June 1979

[SEAL]

Attest:

RUTH C. MASON
Attesting Officer

DONALD W. BANNER
Commissioner of Patents and Trademarks